(12) United States Patent
Opitz et al.

(10) Patent No.: US 7,624,338 B2
(45) Date of Patent: Nov. 24, 2009

(54) DOCUMENT MODELING WITHIN A DOCUMENT FRAMEWORK

(75) Inventors: Dagmar Opitz, Sandhausen (DE); Hamid Moghaddam, Osterburken (DE); Berthold Wocher, Gaiberg (DE); Uwe Herold, Ketsch (DE)

(73) Assignee: SAP AG, Walldorf (DE)

(*) Notice: Subject to any disclaimer, the term of this patent is extended or adjusted under 35 U.S.C. 154(b) by 245 days.

(21) Appl. No.: 11/360,190

(22) Filed: Feb. 22, 2006

(65) Prior Publication Data

US 2007/0198994 A1 Aug. 23, 2007

(51) Int. Cl.
*G06F 17/00* (2006.01)
*G06F 9/46* (2006.01)

(52) U.S. Cl. .................... 715/209; 719/318; 707/100
(58) Field of Classification Search ................ 719/318, 719/330–332; 715/209; 705/36 R; 707/100
See application file for complete search history.

(56) References Cited

U.S. PATENT DOCUMENTS

| | | | |
|---|---|---|---|
| 5,537,526 A * | 7/1996 | Anderson et al. ........... 715/209 |
| 6,347,307 B1 * | 2/2002 | Sandhu et al. ............ 705/36 R |
| 6,681,371 B1 * | 1/2004 | Devanbu .................... 715/209 |
| 6,718,371 B1 * | 4/2004 | Lowry et al. ................ 709/213 |
| 6,978,259 B1 * | 12/2005 | Anderson et al. ............ 706/19 |
| 7,028,306 B2 * | 4/2006 | Boloker et al. .............. 719/310 |
| 2002/0194388 A1 * | 12/2002 | Boloker et al. ............. 709/310 |
| 2003/0066028 A1 * | 4/2003 | Payne et al. ................. 715/500 |
| 2005/0114771 A1 * | 5/2005 | Piehler et al. ............... 715/536 |

* cited by examiner

*Primary Examiner*—Van H Nguyen
(74) *Attorney, Agent, or Firm*—Schwegman, Lundberg & Woessner, P.A.

(57) ABSTRACT

Various embodiments include one or more of systems, methods, and software for document modeling. Some embodiments include defining a document model having further models of document portions. The document portions may include a header model including a set of header methods to provide interaction capabilities to other portions of a system and one or more item models, including a set of item methods to provide interaction capabilities to other portions of the system. The header model and the one or more item models may each include an association with one or more component models. Each component model may include a set of component methods to provide interaction capabilities to other portions of the system and component specific logic accessible through the component methods. Maps may also be provided between the models and wall as a link between the set of component methods and the component specific logic.

19 Claims, 7 Drawing Sheets

DOCUMENT MODELING WITHIN A DOCUMENT FRAMEWORK

TECHNICAL FIELD

The inventive subject mater relates to data processing and, more particularly, to a document framework.

BACKGROUND INFORMATION

Business computing systems are commonly used to create documents. Such documents include orders, quotations, contracts, invoices, service call records, and many others. The business computing systems used to create these documents require custom logic for each document. However, maintaining code implementing this logic becomes a larger task in proportion to the number of document types that are added to the system. Further, creation of the logic for each document is a time consuming process.

SUMMARY

In general, a business software solution to create documents consists of different objects, such as objects for orders, quotations, contracts, and the like. These business documents can be built up and orchestrated according to business processes, such as sell from stock or customer service. However, all business documents, although they are distinct from their business meaning, have a high overlap in regard to their functions and features as well as in the business data and process flows. This high overlap is leveraged in the various embodiments described herein to provide a high reuse of functionality. Some such embodiments standardize process flows and communication between reusable components to reduce the amount of logic maintained for the various document types. Further, through reuse of the components, documents can be quickly modeled and implemented within a system, such as a system having a service oriented architecture. Thus, through the use of reusable components as described herein, cost and time overhead related to creation and maintenance of business document types is greatly reduced.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, Application Specific Integrated Circuit (ASIC), microprocessor, or other type of processor operating on a system, such as a personal computer, server, a router, or other device capable of processing data including network interconnection devices.

Figure 1:
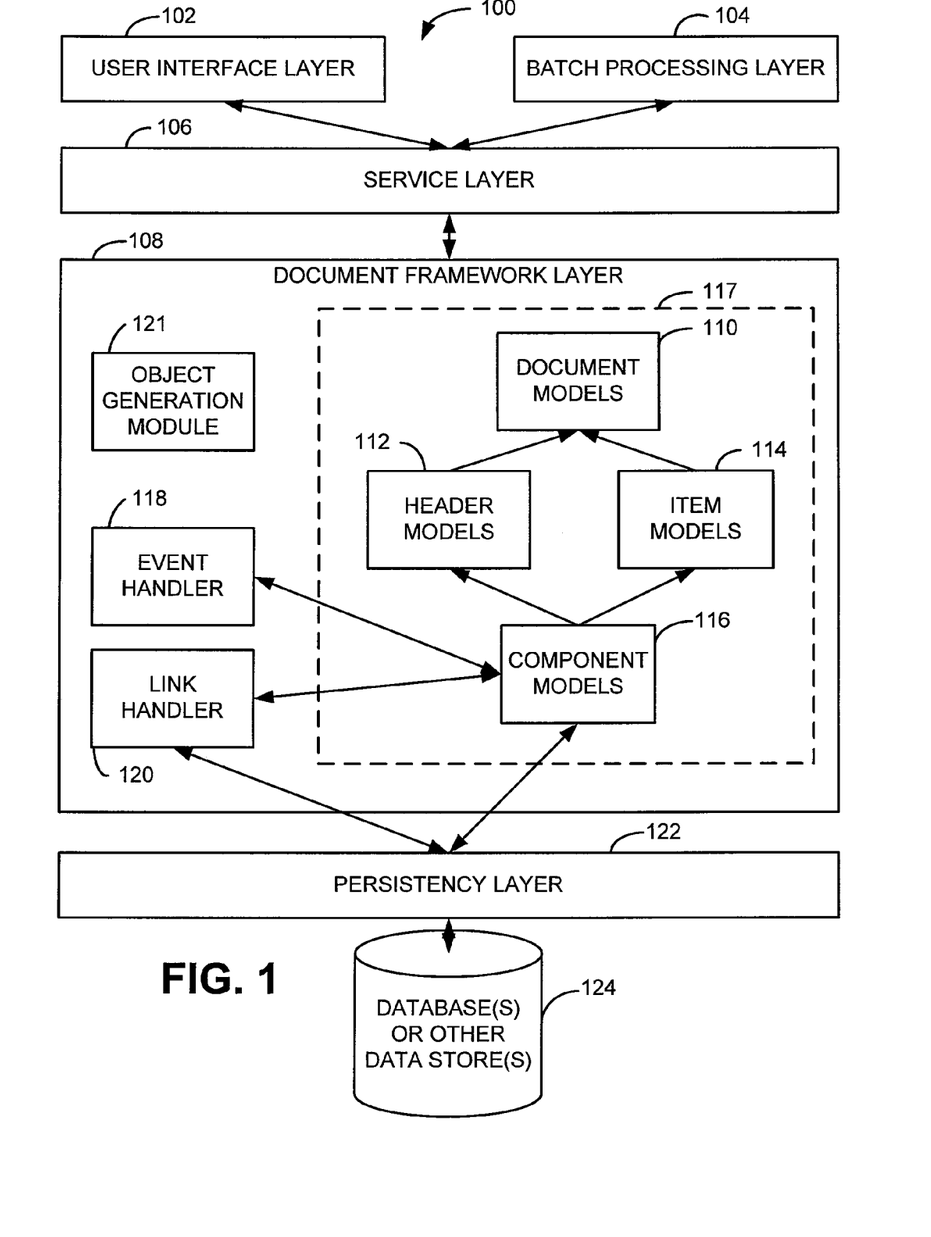
FIG. 1 is a schematic block diagram of a system according to an example embodiment.

FIG. 1 is a schematic block diagram of a system 100 according to an example embodiment. The example system 100 is a multilayered system having a service oriented architecture. However, the subject matter described herein can be practiced on other architectures that include objects that provide services to other portions of a system.

The system 100 includes a user interface layer 102 and a batch processing layer 104 that access other portions of the system 100 via a service layer 106. The other portions of the system 100 include a document framework layer 108. Below the document framework layer is a persistency layer 122 that provides data access services to the document framework layer 108 and other portions of the system. Below the persistency layer 122 are one or more databases or other data stores 124 (hereinafter "database 124").

The user interface layer 102 provides system 100 interaction functionality to system 100 users. In some embodiments, the user interface layer 102 generates and displays user interfaces, such as graphical user interfaces, to users, receives input and displays output. Input received into a user interface is communicated to other portions of the system 100, such as the document framework layer 108, via the service layer 106. In response to received input, the service layer 106 directs the input to the other portions of the system 100 which processes the input and generates output. The output is communicated back to the user interface layer 102 via the service layer 106.

The batch processing layer 104 is a layer within which batch processing jobs execute. In some embodiments, the batch processing layer 104 processes data or causes data to be processed by one or more of the other portions of the system, such as the document framework layer 108. The batch processing layer interacts with the other portions of the system via the service layer 106.

The service layer 106 includes methods which can be called by the user interface layer 102 and batch processing layer 104 to request data from and/or processing by other portions of the system 100. In some embodiments, the user interface layer 102 and the batch processing layer 104 can only access other portions of the system 100 via the service layer 106. The service layer 106 then accesses the other portions of the system 100 via methods of objects, such as document object 117, within the other portions of the system 100.

The other portions of the system 100 can generally be referred to as an application layer. In some embodiments, the application layer includes the core data processing logic of the system 100. For example, the application layer includes the document framework layer 108.

In some embodiments, the document framework layer 108 includes document models 110, header models 112, item models 114, component models 116, and an object generation module 121. In some such embodiments, the document framework layer 108 also includes one or more of an event handler 118 and a link handler 120.

The document framework layer 108 is used within the system to define document models 110 for use by the object generation module 121 in generating document objects 117. A document model 110 includes a header model 112 and one or more item models 114. Header models 112 and item models 114 are each defined by associating one or more component models 116 to the header model 112 or item model 114. In some embodiments, document objects 117 are generated on demand, such as upon a request received from the service layer 106, by the object generation module 121 to create or modify a document. A generated object executes within the document framework layer 108 and on the system 100.

A component model 116 is a model of a low-level document portion such as a customer name, shipping address, bill-to address, an item line on an invoice, a total cost, a sales tax percentage, and the like. Component models 116 are used to define elements of the higher-level header models 112 and item models 114. Defined component models 116 are included in the higher-level models through association.

In some embodiments, a component model 116 includes an association with one or more data items. In some embodiments, the one or more data item associations is made through the persistency layer 122 or directly to the database 124. However, in some embodiments, the link handler 120 is accessed prior to storing or retrieving data from the persistency layer 122. The link handler 120 is discussed in greater detail below.

In some embodiments, each component model 116 includes a set of methods to allow header models 112 and item models 114 access to each component model 116. These methods provide a standardized interface to the header models 112 and item models 114. Each component model 116 further includes component model 116 specific data associations and/or logic. A component model 116 definition provides a link between the standardized interface and the component specific data associations and/or logic. In some embodiments, the logic of a component cannot access the standardized methods or component specific data associations or logic of another component.

A header model 112 is a model of a header portion of a document. A header portion of a document generally includes company information, such as company name, address, phone numbers, and the like. A header portion of a document, depending on the document type, also generally includes a ship to entity and address, a bill to entity and address, a contact name, phone numbers, and the like. A header model 112 includes an association with one or more component models 116. A component model 116 is associated with a header model 112 for each portion of the header model 112. For example, a component model for each of a company name, address, and phone number is associated with the header model 112 for the company that will create a document using the header model 112. Header models 112 access component model 112 data and logic through the component model standardized interface as described above.

In some embodiments, an item model 114 is a model of an item within a detail portion of a document. For example, an item model 114 can be a model of a line item on an invoice. The model of the line item on the invoice can be of a "product purchased," "a cost per unit of the product," "the quantity of the product purchased," and "a total cost of the quantity of the item purchased." An item model 114 includes an association with one or more component models. In the example invoice line item model, a component 116 exists and is associated with the item model 114 for each of the "product purchased,". "a cost per unit of the product," "the quantity of the product purchased," and "a total cost of the quantity of the item purchased." Item models 114 access component model 112 data and logic through the component model standardized interface as described above.

In embodiments of the document framework layer 108 including an event handler 118, component models 116 can be registered with the event handler as subscribers of one or more events. Such events are events that can occur in a component object within a document object generated by the object generation module 121 based on other component models 116.

For example, an "order confirmation document" document object is generated by the object generation module 121 based on a document model 110 of an "order confirmation document" type. The "order confirmation document" document object includes a portion based on a header model including an association to a "ship to address" component model. The "order confirmation document" document object 117 further includes a portion based on an item model 114 including an association to an "estimated delivery date" component model 116. In this embodiment, the "estimated delivery date" component model 116 estimates a delivery date of products that are the subject of the invoice as a function of the "ship to address." The "estimated delivery date" component model 116 is registered with the event handler 118 as a subscriber of an update event of the "ship to address." Thus, if a change occurs to the "ship to address," the portion of the "order confirmation document" document object 117 of the "ship to address" component model 116 sends a message to the event handler 118 representative of the address change. The event handler 118 then sends a message to all subscribers of that event, if any. In this example, the "estimated delivery date" component model 116 receives the message and updates it value.

In some embodiments, component model 116 event subscriptions are created and stored at the component model 116 level. Thus, when a higher level model is created using a component model having an event subscription, the component event subscriptions are automatically included in the higher level models. Therefore, event subscriptions do not need to be declared at the header model 112 or item model levels.

In embodiments of the document framework layer 108 including a link handler 120, the link handler 120 operates to reduce redundant data storage for individual documents. In some embodiments including the link handler 120, component models 116, when storing data send the data to the link handler 120 before sending the data to the persistency layer 122. The link handler 120 parses the data from the component models 116 to determine if there is any redundancy between the data to be stored. For example, if a document includes a "billing address" and a "ship to address," the link handler 120 parses the data and identifies if the "billing address" and the "ship to address" are identical. If they are identical, the link handler 120 communicates the redundancy of data to the persistency layer 122. The persistency layer 122 then decides whether or not to store the redundant data in one record or more than one record. If the persistency layer 122 stores the data in a single record, notification to that effect is sent back to the link handler 120. The link handler 120 stores an indication that the data is stored in a single record. Thus, if one or more component models subsequently need to retrieve the "bill to address" or the "ship to address," the component models first check with the link handler 120 before requesting the data from the persistency layer 122, to determine if the data is stored in one or more locations. The link handler 120 then retrieves the single instance of the data and propagates the single instance of the data to both component models. Further detail regarding the link handler 120 is discussed below with regard to FIG. 4.

Figure 2:
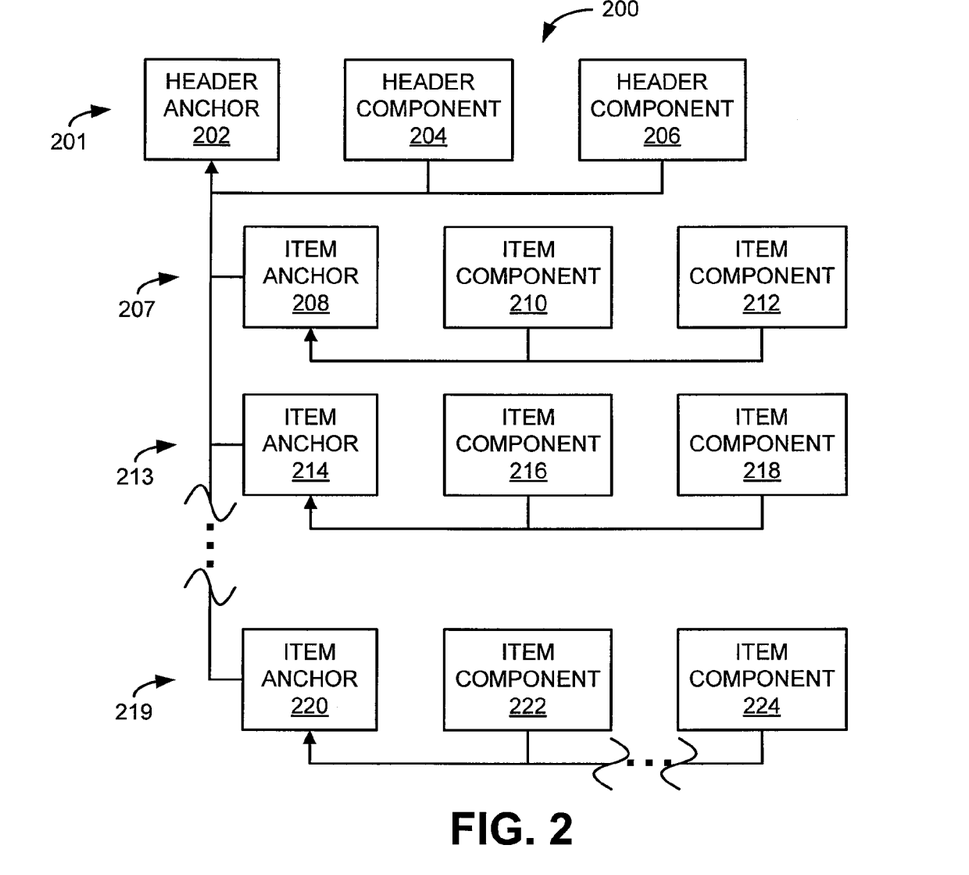
FIG. 2 is a block diagram of a document model according to an example embodiment.

FIG. 2 is a block diagram of a document model 200 according to an example embodiment. The example document model 200 illustrates how a header model 201 and items models 207, 213, 219, each including components, are linked together to form the document model 200.

The header model 201 is defined and stored within a system, such as system 100 of FIG. 1. The header model 201 includes a header, identified as header anchor 202, and associated component models, identified as header components 204, 206. In some embodiments, the header components 204, 206 are associated with the header anchor 202 by referencing a unique identifier of each header component 204, 206 in the header model 201. Although the illustrated header model 201 includes only two header components 204, 206, other header models include one or more associated header components.

The item models 207, 213, 219 are also defined and stored within the system. Each item model 207, 213, 219 includes item models, identified as item anchors 208, 214, 220, and associated component models, identified as item components 210, 212, 216, 218, 222, 224. The item components are associated with the item anchors by referencing a unique identifier of the respective item components in the respective item models 207, 213, 219. Although the illustrated item models 207, 213, 219 each include two item components, other item models have one or more associated item components.

In some embodiments, an individual component model can be used more than once within the document model. For example, a "product quantity" component model can be included within two distinct "product" item models.

Figure 3:
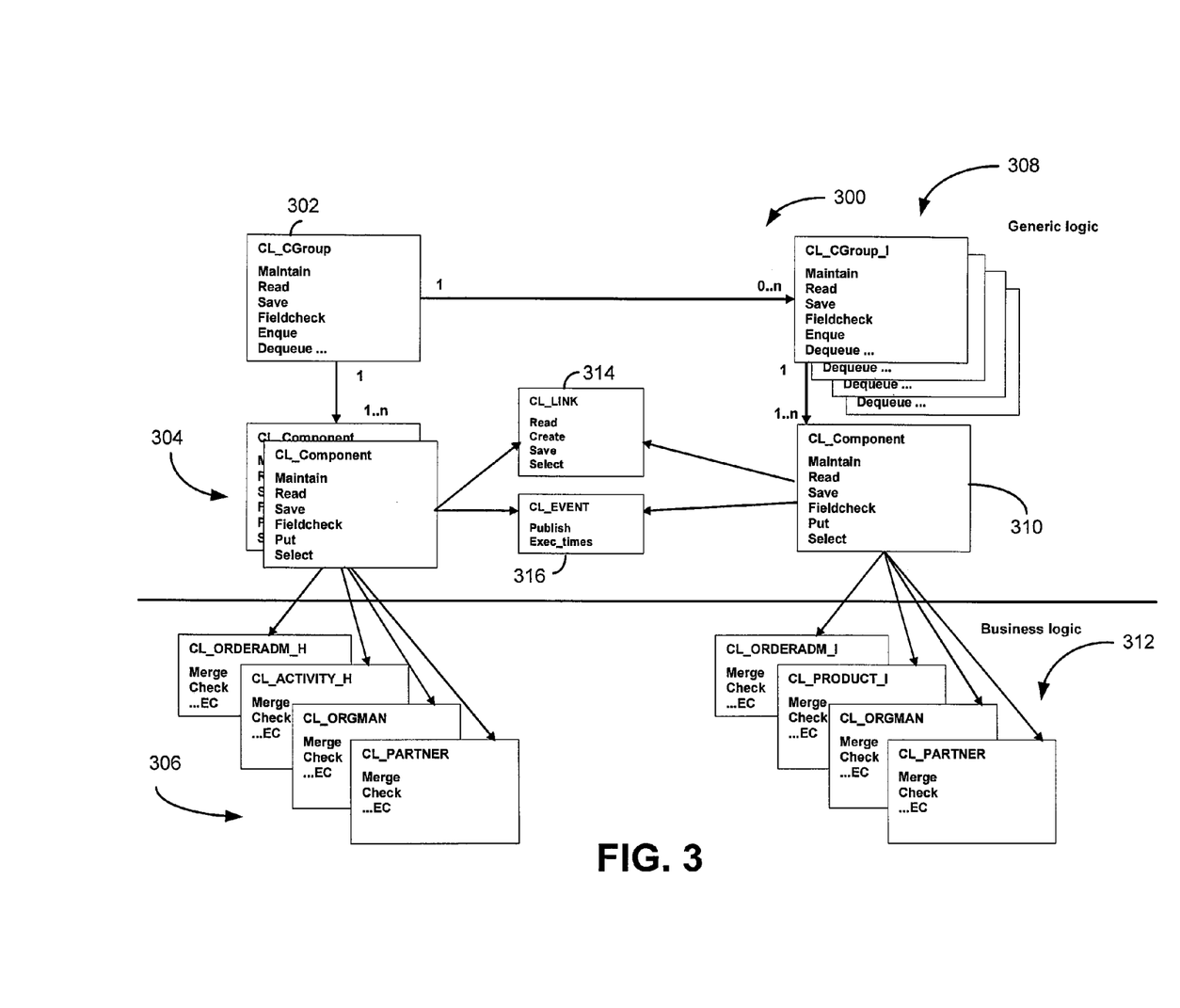
FIG. 3 is a block diagram of a document model according to an example embodiment.

FIG. 3 is a block diagram of a document model 300 according to an example embodiment. The example document model 300 illustrates how the composition of the header model 302, item models 308, and component models 304, 310 are related and how they interact.

The header model 302 includes a set of standardize header methods that can be called by a system service layer, such as the service layer 106 of FIG. 1. These methods are mapped within the header model 302 to one or more standardized item methods of item models 308 associated with the header model 302 or standardized component methods of component models 304 associated with the header model 302. A header model 302 can be associated to zero to many item models 308 and one or more component models 304.

Each of the item models 308 includes a set of standardized item methods that can be called by the header model 302 or a system service layer, such as the service layer 106 of FIG. 1. These methods are mapped within the items models 308 to standardized component methods of component models, such as component model 310, associated with the item models 308. An item model 308 can be associated with one or more component models, such as component model 310.

Each of the component models 304, 310 includes a set of standardized component methods that can be called by the header model 302 or item model 308 the component model 304, 310 is directly associated with. In some embodiments, each of the component models 304, 310 includes component model specific business logic 306, 312 in methods. In such embodiments, the component models 304, 310 include a mapping of the standardized component methods to the component model specific business logic 306, 312 methods.

Figure 4:
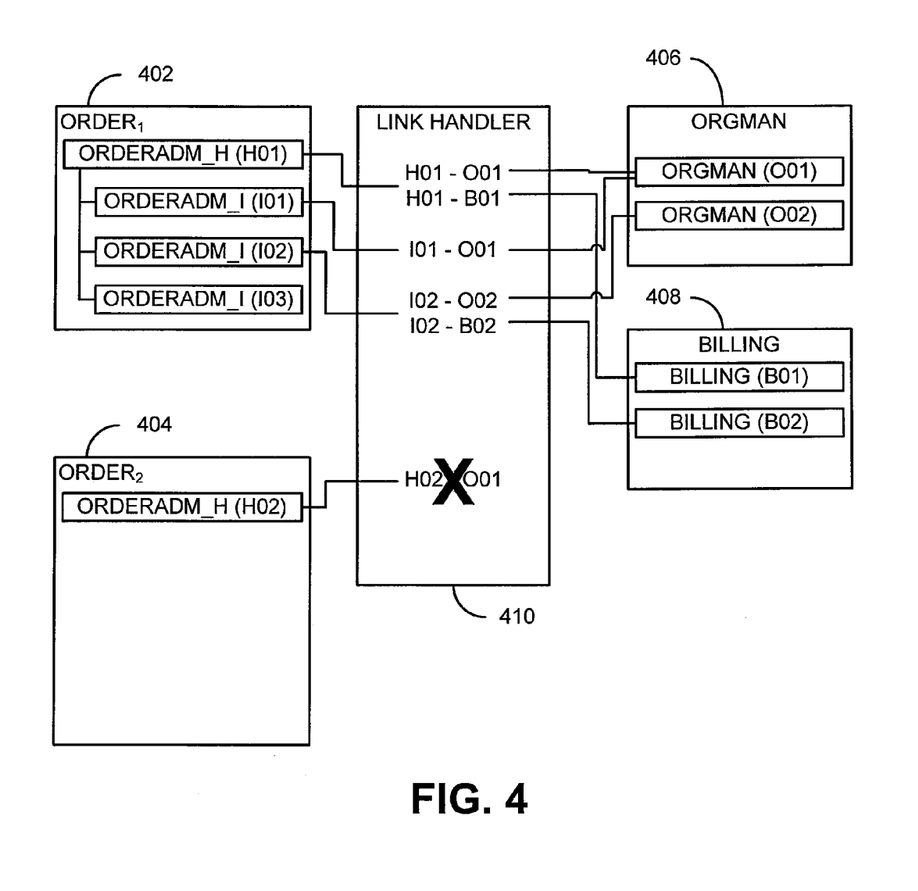
FIG. 4 is a block diagram of a link handler according to an example embodiment.

FIG. 4 is a block diagram of a link handler 410 according to an example embodiment. In the example embodiment of FIG. 4, the naming of the various portions and the link names and associations are provided merely for illustrative purposes. Naming and link associations vary from embodiment to embodiment depending on the requirements of the various embodiments. The block diagram includes $ORDER_1$ 402 and $ORDER_2$ 404 documents. The data of the $ORDER_1$ 402 and $ORDER_2$ 404 documents is stored in two tables, ORGMAN 406 and BILLING 408.

The $ORDER_1$ 402 document includes data associated with ORDERADM_H (H01) header data, and ORDERADM_I (I01), ORDERADM_I (I02), and ORDERADM_I (I03) item data. The link handler 410 identifies where each $ORDER_1$ 402 data element is stored. For example, the ORDERADM_H (H01) header data is stored in part as a record in the ORGMAN table, ORGMAN (O01) record and in part as a record in the BILLING table, BILLING (B01) record. The link handler 410 identifies this relation between $ORDER_1$ 402 document data and the tables via the listed links of the link handler 410. For example, "H01-O01" and "H01-B01" identifies the $ORDER_1$ 402 document data in the appropriate records of each of the ORGMAN and BILLING tables.

Referring now to ORDERADM_I (I02) of the $ORDER_1$ 402 document, the link handler identifies the link to the data in the tables as being the ORGMAN (O01) record. This link illustrates how the link handler 410 operates to reduce redundant data storage for individual documents. In this example, the data of the ORDERADM_I (I02) item portion of the document is the same as part of the ORDERADM_H (H01) header data. Thus, the link handler, upon receiving the data can recommend to a persistency layer, such as persistency layer 122 to store the redundant data in a single record.

However, some embodiments of the link handler 410 do not allow links between documents. For example, $ORDER_2$ 404 includes header document data ORDERADM_H (H02) which is the same as part of the header document data of $ORDER_1$ 402 stored in ORGMAN record ORGMAN (O01). However, the link handler 410 does not allow a link from one document to the data of another document. This is illustrated within the link handler by the bold "X".

Figure 5:
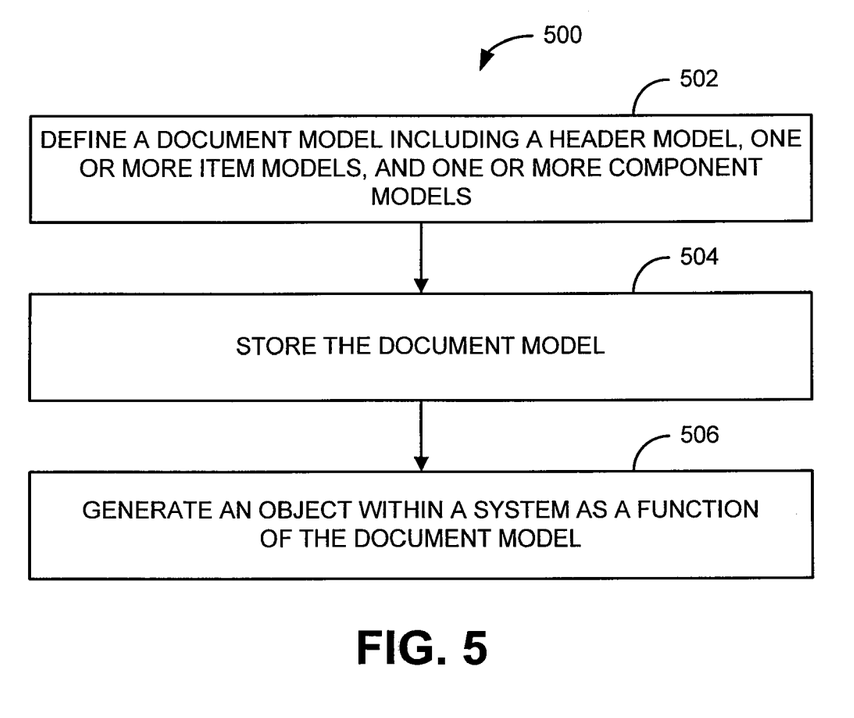
FIG. 5 is a block flow diagram of a method according to an example embodiment.

FIG. 5 is a block flow diagram of a method 500 according to an example embodiment. In some embodiments, the method 500 includes defining a document model including a header model, one or more item models, and one or more component models 502. Some such embodiments further include one or both of storing the document model 504 and generating an object within the system as a function of the document model 506.

In some embodiments, a header model includes a set of header methods to provide interaction capabilities to other portions of a system and the one or more item models each include a set of item methods to provide interaction capabilities to other portions of the system. In such embodiments, the header model and the one or more item models each include an association with one or more component models. A component model, in come embodiments, includes a set of component methods to provide interaction capabilities to other portions of the system, and component specific logic accessible through the component methods.

In some embodiments, storing the document model 504 includes storing a representation of an association of a header model with one or more component models and zero to many item models, each associated with one or more component models. In some embodiments, the document model is stored in a database. In other embodiments, the document model is stored via a persistency layer and is accessible by an object generator. In such embodiments, the object generator generates one or more objects within a system as a function of the document model 506. The one or more objects can include an object for each component model, item model, and header model included within a document model.

Figure 6:
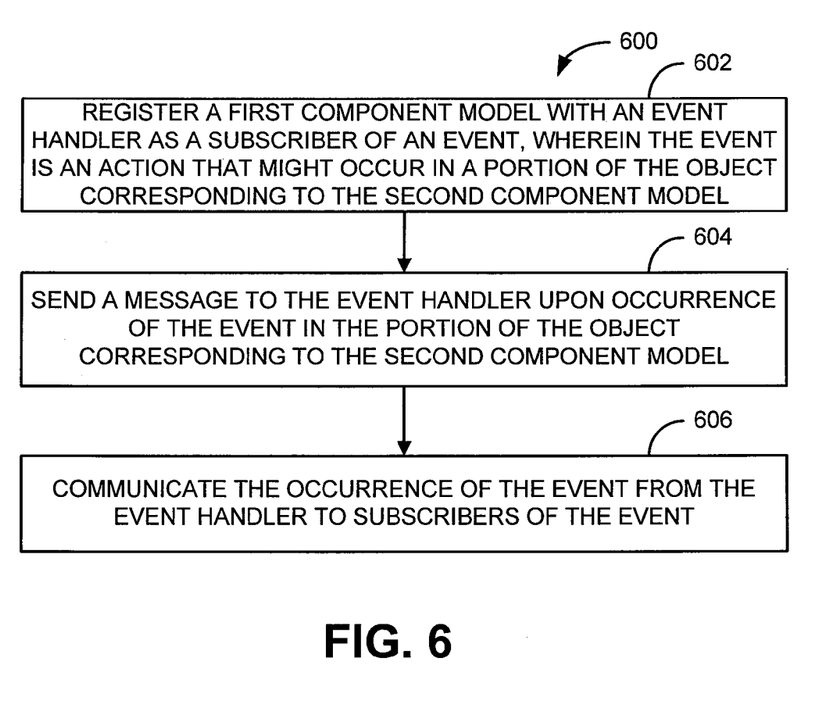
FIG. 6 is a block flow diagram of a method according to an example embodiment.

FIG. 6 is a block flow diagram of a method 600 according to an example embodiment. The method 600 includes registering a first component model with an event handler as a subscriber of an event, wherein the event is an action that might occur in a portion of an object corresponding to the second component model 602. The method 600 further includes sending a message to the event handler upon occurrence of the event in the portion of the object corresponding to the second component model 604 and communicating the occurrence of the event from the event handler to subscribers of the event 606.

In some such embodiments, a portion of the object corresponding to the first component model includes a calculated value calculated as a function of a value from the portion of the object corresponding to the second component model. Thus, a change to the value of the portion of the object corresponding to the second component model causes the message to be sent to the event handler including the changed value from the portion of the object corresponding to the second component model. In this embodiment, the event handler then forwards the changed value to the portion of the object corresponding to the first component model which calculates its value as a function of the changed value.

Figure 7:
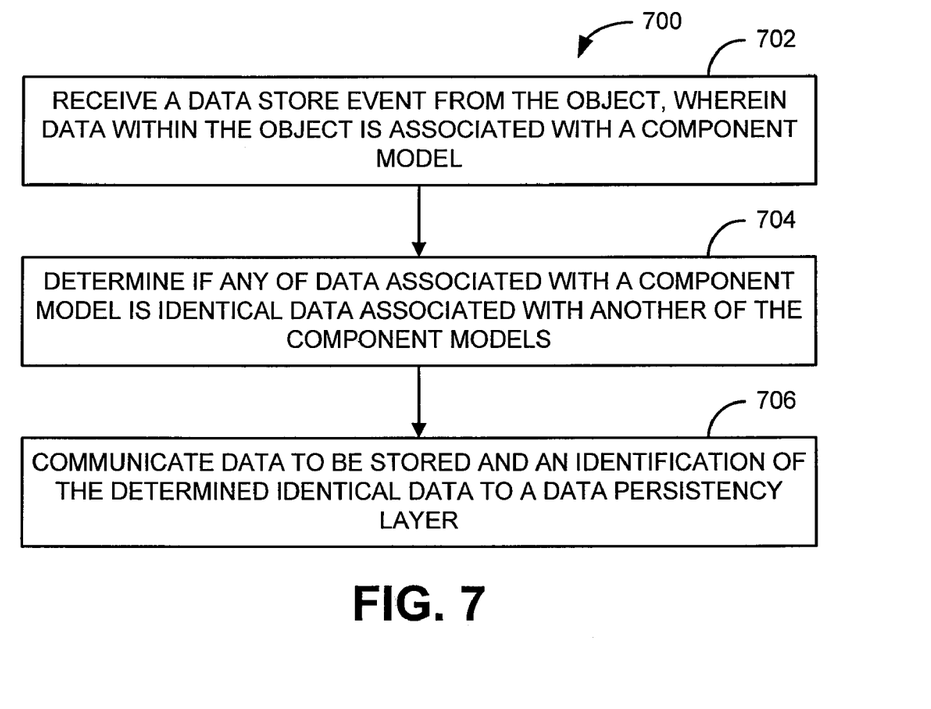
FIG. 7 is a block flow diagram of a method according to an example embodiment.

FIG. 7 is a block flow diagram of a method 700 according to an example embodiment. The example method 700 includes receiving a data store event from an object, wherein data within the object is associated a component model 702. The method 700 further includes determining if any data associated with one or more component models is identical data associated with another of the component models 704 and communicating data to be stored and an identification of the determined identical data to a data persistency layer 706. In some such embodiments, the data persistency layer determines if the identical data should be stored as one or more instances and stores an indication of the identical data stored in one instance and an representation of the one location where the identical data is stored.

These embodiments, and other, according to the subject matter herein provide a set of reusable components that can be used to build reusable item models and reusable header models. These reusable models can then be used to build document models for each document type needed within a system. Through the reuse of the component, item, and header models, document type development is quick and require less development effort and expense than previous systems. Further, by removing the relation of logic to persistent data, further reuse of logic is possible.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A method comprising:
receiving input via user interface of a system performing the method, the input defining a document model for generation of documents, wherein the document model includes:
a header model including a set of header methods to provide interaction capabilities to other portions of a system,
one or more item models, including a set of item methods to provide interaction capabilities to other portions of the system,
wherein the header model and the one or more item models each include an association with one or more component models, and
wherein each component model includes:
a set of component methods to provide interaction capabilities to other portions of the system, and
component specific logic accessible through the component methods, providing a first map within the header model between the set of header methods and the set of item methods,
providing a second map within the item model between the set of item methods and the set of component methods,
providing a link between the set of component methods and the component specific logic, and
storing the document model in a data storage device of the system performing the method.

2. The method of claim 1, further comprising:
generating an object within the system as a function of the document model.

3. The method of claim 2, further comprising:
registering a first component model with an event handler as a subscriber of an event, wherein the event is an action that might occur in a portion of the object corresponding to the second component model;
sending a message to the event handler upon occurrence of the event in the portion of the object corresponding to the second component model; and
communicating the occurrence of the event from the event handler to subscribers of the event.

4. The method of claim 3, wherein:
a portion of the object corresponding to the first component model includes a calculated value calculated as a function of a value from the portion of the object corresponding to the second component model,
wherein a change to the value of the portion of the object corresponding to the second component model causes the message to be sent to the event handler including the changed value from the portion of the object corresponding to the second component model, and wherein the event handler then forwards the changed value to the portion of the object corresponding to the first component model which calculates its value as a function of the changed value.

5. The method of claim 2, further comprising:

receiving a data store event from the object, wherein data within the object is associated with a component model;

determining if any of data associated with a component model is identical to data associated with another of the component models;

communicating data to be stored and an identification of the determined identical data to a data persistency layer.

6. The method of claim 5, wherein:

the data persistency layer determines if the identical data should be stored as one or more instances; and the data persistency layer stores an indication of the identical data stored in one instance and a representation of the one location where the identical data is stored.

7. The method of claim 2, further comprising:

retrieving a plurality of data items to populate the object, wherein:

the object determines if any of the plurality of data items to be retrieved are identical data items stored in a single location, and data items that are identical and stored in one location are retrieved once and populated to multiple locations within the object.

8. A system comprising:

a processor;

a memory device coupled to the processor and storing instructions defining modules, the instructions of the modules executable by the processor, the modules including:

a user interface module for providing a user interface layer;

a service module electronically coupled to the user interface module for providing a service layer providing services to the user interface layer; and a document framework module electronically coupled to the service module for providing a document framework layer, the document framework layer including:

a component module for providing component models and providing a link between a set of component methods and a component specific logic, an item module electronically coupled to the component module for providing item models each including an association to one or more component models, the item module providing a first map within the item model between a set of item methods and the set of component methods, a header module electronically coupled to the component module and the item module for providing header models each including an association to one or more component models, the header module providing a second map within the header model between a set of header methods and the set of item methods, a document module electronically coupled to the header module and the item module for providing document models each including an association to one header model and one or more item models, and an object generation module that generates document objects upon receipt of a command originating in the user interface layer and received from the service layer, wherein the object generation module generates a document object as a function of a document model, the document object operable to generate documents based on the document model.

9. The system of claim 8, further comprising:

an event handler electronically coupled to the component module for registering with the event handler a first component model as a subscriber of an event and sending a message to a first portion of a generated object associated with the first component model upon occurrence of the event in a second portion of the generated object associated with a second component model.

10. The system of claim 9, further comprising:

a link handler electronically coupled to the component module for:

intercepting data create and update requests from objects generated within the document framework layer, identifying multiple instances of identical data with individual data create and update requests, and forwarding a data consolidation recommendation along with the data of the individual data create and update requests to a data persistency layer.

11. The system of claim 9, further comprising:

a link handler electronically coupled to the component module for:

intercepting data read requests from objects generated within the document framework layer, determining if any of a plurality of requested data items are identical data items stored in a single location by a data persistency layer, retrieving distinct data items; and propagating the determined identical data items to each respective portion of the object requesting the identical data items.

12. A machine-readable storage medium, with instruction which when processed, result in a machine:

defining a document model for generation of documents, wherein the document model includes:

a header model including a set of header methods to provide interaction capabilities to other portions of a system, one or more item models, including a set of item methods to provide interaction capabilities to other portions of the system, wherein the header model and the one or more item models each include an association with one or more component models, and wherein each component model includes:

a set of component methods to provide interaction capabilities to other portions of the system, and component specific logic accessible through the component methods, providing a first map within the header model between the set of header methods and the set of item methods, providing a second map within the item model between the set of item methods and the set of component methods, and providing a link between the set of component methods and the component specific logic.

13. The machine-readable medium of claim 12, wherein the instructions when processed, further result in the machine:

storing the document model.

14. The machine-readable medium of claim 12, wherein the instructions when processed, further result in the machine:

generating an object within the system as a function of the document model.

15. The machine-readable medium of claim 14, wherein the instructions when processed, further result in the machine:
registering a first component model with an event handler as a subscriber of an event, wherein the event is an action that might occur in a portion of the object corresponding to the second component model;
sending a message to the event handler upon occurrence of the event in the portion of the object corresponding to the second component model; and
communicating the occurrence of the event from the event handler to subscribers of the event.

16. The machine-readable medium of claim 15, wherein:
a portion of the object corresponding to the first component model includes a calculated value calculated as a function of a value from the portion of the object corresponding to the second component model,
wherein a change to the value of the portion of the object corresponding to the second component model causes the message to be sent to the event handler including the changed value from the portion of the object corresponding to the second component model, and
wherein the event handler then forwards the changed value to the portion of the object corresponding to the first component model which calculates its value as a function of the changed value.

17. The machine-readable medium of claim 14, wherein the instructions when processed, further result in the machine:
retrieving a data store event from the object, wherein data within the object is associated with a component model;
determining if any of data associated with a component model is identical to data associated with another of the component models;
communicating data to be stored and an identification of the determined identical data to a data persistency layer.

18. The machine-readable medium of claim 17, wherein:
the data persistency layer determines if the identical data should be stored as one or more instances; and
the data persistency layer stores an indication of the identical data stored in one instance and representation of the one location where the identical data is stored.

19. The machine-readable medium of claim 14, wherein the instructions when processed, further result in the machine:
retrieving a plurality of data item to populate the object, wherein:
the object determines if any of the plurality of data items to be retrieved are identical data items stored in a single location, and
data items that are identical and stored in one location are retrieved once and populated to multiple locations within the object.

\* \* \* \* \*

UNITED STATES PATENT AND TRADEMARK OFFICE
CERTIFICATE OF CORRECTION

PATENT NO.       : 7,624,338 B2                                                            Page 1 of 1
APPLICATION NO. : 11/360190
DATED            : November 24, 2009
INVENTOR(S)      : Opitz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 520 days.

Signed and Sealed this

Twenty-sixth Day of October, 2010

David J. Kappos
*Director of the United States Patent and Trademark Office*